(12) United States Patent
Tidwell

(10) Patent No.: US 8,439,204 B1
(45) Date of Patent: May 14, 2013

(54) REUSABLE DROP-IN ENGINE OIL FILTERS

(75) Inventor: Kelly Tidwell, Huntington Beach, CA (US)

(73) Assignee: Pure Power! Incorporated, Huntington Beach, CA (US)

( * ) Notice: Subject to any disclaimer, the term of this patent is extended or adjusted under 35 U.S.C. 154(b) by 521 days.

(21) Appl. No.: 11/520,465

(22) Filed: Sep. 12, 2006

(51) Int. Cl.
| | |
|---|---|
| *B01D 27/00* | (2006.01) |
| *B01D 35/00* | (2006.01) |
| *B01D 29/07* | (2006.01) |
| *B01D 39/00* | (2006.01) |
| *B01D 39/12* | (2006.01) |
| *B01D 39/10* | (2006.01) |
| B01D 35/28 | (2006.01) |

(52) U.S. Cl.
USPC ...... 210/437; 210/167.02; 210/435; 210/450; 210/483; 210/484; 210/487; 210/493.1; 210/493.2; 210/493.5

(58) Field of Classification Search .................. None
See application file for complete search history.

(56) References Cited

U.S. PATENT DOCUMENTS

| | | | | |
|---|---|---|---|---|
| 2,413,991 | A | * | 1/1947 | Newman ................... 210/457 |
| 2,966,990 | A | | 1/1961 | Sicard |
| 3,076,550 | A | * | 2/1963 | Wilhelm ................... 210/232 |
| 3,111,488 | A | * | 11/1963 | Casaleggi ................. 210/232 |
| 3,232,437 | A | | 2/1966 | Hultgren |
| 3,254,769 | A | * | 6/1966 | McArthur ................. 210/194 |
| 3,262,570 | A | | 7/1966 | Gailitis et al. |
| 3,283,902 | A | | 11/1966 | Farris et al. |
| 3,315,809 | A | | 4/1967 | Hultgren |
| 3,334,754 | A | | 8/1967 | Kudlaty |
| 3,465,883 | A | * | 9/1969 | Jumper .................... 210/307 |
| 3,526,590 | A | | 9/1970 | Russo |
| 3,684,100 | A | | 8/1972 | Close |
| 4,529,515 | A | | 7/1985 | Selz |
| 4,622,136 | A | | 11/1986 | Karcey |
| 4,872,976 | A | | 10/1989 | Cudaback |
| 5,066,391 | A | | 11/1991 | Faria |
| 5,209,845 | A | * | 5/1993 | Sims ....................... 210/232 |
| 5,548,893 | A | | 8/1996 | Koelfgen |
| 5,569,373 | A | | 10/1996 | Smith et al. |
| 5,679,244 | A | | 10/1997 | Tettman et al. |
| 5,711,872 | A | * | 1/1998 | Jones et al. .............. 210/130 |
| 5,888,383 | A | | 3/1999 | Cox |

(Continued)

OTHER PUBLICATIONS

Oiltech, The Spinner II Cleanable Screen Product Information and Application Chart, 2 pgs, undated.

(Continued)

*Primary Examiner* — Benjamin Kurtz

(74) *Attorney, Agent, or Firm* — Welsh Flaxman & Gitler LLC

(57) ABSTRACT

A drop-in oil filter having top and bottom caps having annular recesses on facingly disposed surfaces adjacent their outer periphery, a pleated, woven metal cylindrical filter element having an outer and an inner diameter, a first cylindrical wire cage over the outer diameter of the filter element, a second cylindrical wire cage within the inner diameter of the filter element, ends of the filter element and the first and second cylindrical wire cages being fastened into the annular recesses in the top and bottom caps, the bottom cap having a first opening there through concentric with and within inner diameters of the filter element and the first and second cylindrical wire cages, and a first elastic grommet within the first opening having a central opening for sealing on a tube within a drop-in filter housing.

17 Claims, 4 Drawing Sheets

U.S. PATENT DOCUMENTS

| | | | |
|---|---|---|---|
| 6,024,229 | A | 2/2000 | Ayers |
| 6,086,763 | A | 7/2000 | Baumann |
| 6,221,242 | B1 | 4/2001 | Deibel et al. |
| 6,228,274 | B1 | 5/2001 | Deibel et al. |
| 6,308,836 | B1 * | 10/2001 | Guichaoua et al. ............ 210/440 |
| 6,381,983 | B1 | 5/2002 | Angelo et al. |
| 6,554,139 | B1 | 4/2003 | Maxwell et al. |
| 6,568,539 | B1 | 5/2003 | Deibel et al. |
| 6,595,372 | B1 | 7/2003 | Minowa et al. |
| 6,716,361 | B2 | 4/2004 | Deibel et al. |
| 7,413,089 | B1 | 8/2008 | Tidwell |
| 2002/0036165 | A1 * | 3/2002 | Sommer et al. ............... 210/438 |
| 2003/0010707 | A1 * | 1/2003 | Jokschas et al. .............. 210/457 |
| 2003/0168400 | A1 * | 9/2003 | Ham .......................... 210/493.2 |

OTHER PUBLICATIONS

Oiltech, "Why must the Spinner II's Cleanable screen be used with a Spinner II centrifuge?", 2 pgs, undated.

System 1 Filter Products, "The Leader in High Technology Engine Filtration", pp. 1-4, 6-7, undated.

Penton Media, Inc. & Hydraulics & Pneumatics Magazine, http://www.hydraulicspneumatics.com/200/fpe/accessories/article/true/6444/, Copyright 2010.

* cited by examiner

REUSABLE DROP-IN ENGINE OIL FILTERS

BACKGROUND OF THE INVENTION

1. Field of the Invention

The present invention relates to the field of oil filters.

2. Prior Art

The preferred embodiments of the present invention are intended for use as drop-in engine oil filters, though it is to be understood that filters in accordance with the present invention may be used for other filtering functions such as the filtering of hydraulic fluids and the like. In the case of engine oil filtering, the oil filters themselves have typically been either of two general types. Previously the most common type of engine oil filter is the so-called spin-on filter, typically having a can-like structure having an internally threaded opening in the center of the top thereof, with a plurality of openings encircling the threaded opening and a face seal encircling the plurality of openings. When the spin-on filter is screwed onto a pipe on the filter mount, this seal will seal against an adjacent face of the filter mount, with one or more openings in the filter mount adjacent the threaded pipe providing oil communication to the plurality of openings. Thus oil flows through the plurality of openings, to the periphery of the paper filter element therein, through the filter element, and back out through the threaded pipe for distribution in the engine. These filters spin-on filters are convenient to use and typically easy to change, though have the disadvantage that the filter element enclosure, being part of the filter, is replaced every time the filter is changed.

Drop-in filters, on the other hand, are characterized by a filter enclosure which is a permanent part of the engine. As the name implies, the enclosure may be opened, the old filter removed therefrom, a new filter dropped in in its place, and the enclosure again closed. While this may be a bit messier operation than changing a spin-on filter, it has the economic advantage of reusing the enclosure itself; which should reduce the manufacturing cost of a drop-in filter to approaching that of the filter element within a spin-on filter. That cost savings, however, seems to be enjoyed more by the manufacturers of filters than by the consumer, as the retail prices of drop-in filters are not substantially different from the retail price of spin-on filters.

In the case of prior art drop-in filters, the pleated paper filter element provides a very substantial flow restriction for oil flow through the filter. Thus to provide adequate flow of oil in the engine, a bypass valve is used to provide an alternate oil flow path from the oil pump to the engine when the differential pressure across the oil filter reaches a predetermined level, typically approximately 2 psi. Thus most of the oil circulation through the engine is of oil which has bypassed the filter. Accordingly such filters are generally referred to as nominal extraction filters because of the relatively high bypass flow rate. No effort is generally made to seal the filter with respect to the enclosure to prevent oil flow from the enclosure inlet to the enclosure outlet by passing around the filter element. While the leakage of such oil can be substantial, it is of little consequence in such filters because of the fact that if oil leakage around the filter is avoided, the flow rate through the bypass valve would just increase accordingly. Thus the filtering provided by typical prior art drop-in filters is far from ideal.

In addition, prior art paper filters have been known to disintegrate in use, not only destroying the filtering capabilities, but further dispersing filter fragments throughout the engine, with the potential of clogging critical oil flow passages, causing greatly accelerated wear or even catastrophic failure of the engine. It is understood that this phenomenon has been traced to the use of synthetic oils, though in any event, it highlights the relatively fragile construction of such prior art filters and their potential for disintegration from known or unknown oils or additives.

A typical prior art drop-in filter is illustrated in FIGS. 1 and 2. As shown in these Figures, a pleated cylindrical paper filter element 20 is sandwiched between and cemented to top cap 22 and bottom cap 24. The bottom cap 24 is simply a flat disc-like cap with a hole in the center, top cap 22 being similar, though having protrusions 26 thereon for alignment and retention of the filter by the top of the filter enclosure on the engine, and further with a depression 28 leading to an opening in the center of the top cap 22. A sort of felt or fabric washer 30 is cemented to the bottom cap 24 to complete the assembly. Thus it will be noted that the sole support for the paper filter element is the paper filter element itself. There is also no outer protection for the paper filter element, which could be subject to mishandling and damage when being installed. Finally, course, used drop-in filters must be appropriately disposed of because of their classification as toxic waste. Thus there is an expense in properly disposing of a used filter. The specific prior art filter illustrated in FIGS. 1 and 2 is marked as covered by U.S. Pat. Nos. 6,086,763 and 6,554,139.

DETAILED DESCRIPTION OF THE PREFERRED EMBODIMENTS

The present invention comprises full flow drop-in filters that are cleanable and reusable, that have exceptional ruggedness and which are configured to assure that all oil delivered to the filter enclosure must pass through the filter element. For this purpose the filters of the present invention feature, among other things, a woven stainless steel, pleated, cylindrical filter element, in the preferred embodiment a 22 micron filter element, reinforced against damage on both its outer diameter and its inner diameter by welded stainless steel mesh cages, very securely secured to top and bottom caps by a ceramic cement, the top and bottom caps in the preferred embodiment being machined from solid aluminum stock and which include one or more grommets to seal against the outlet pipe within a filter enclosure to assure oil cannot reach the outlet on the filter mount without passing through the filter element.

Figure 1:
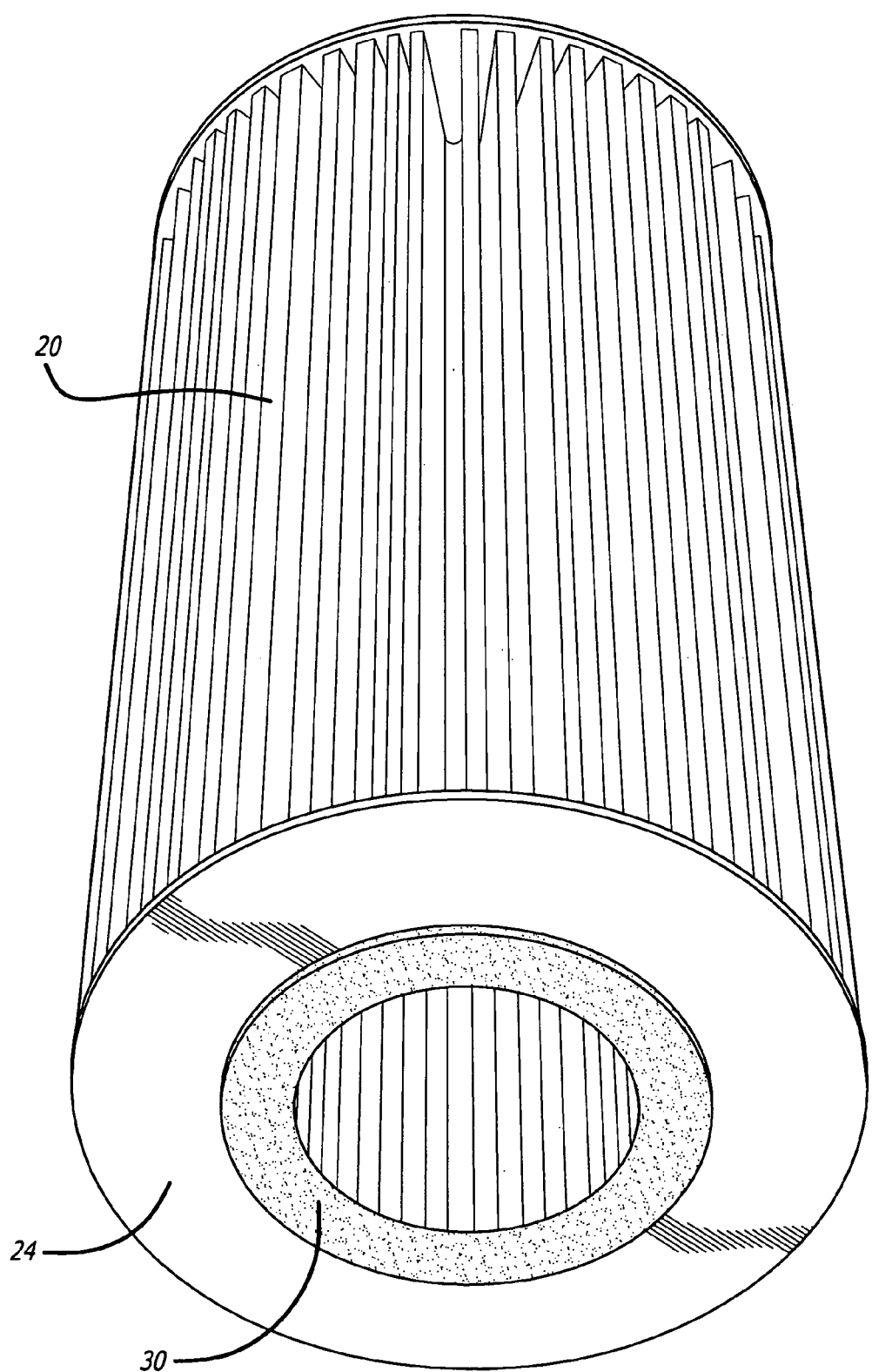
FIG. 1 is a perspective view of a prior art drop-in filter.
Figure 2:
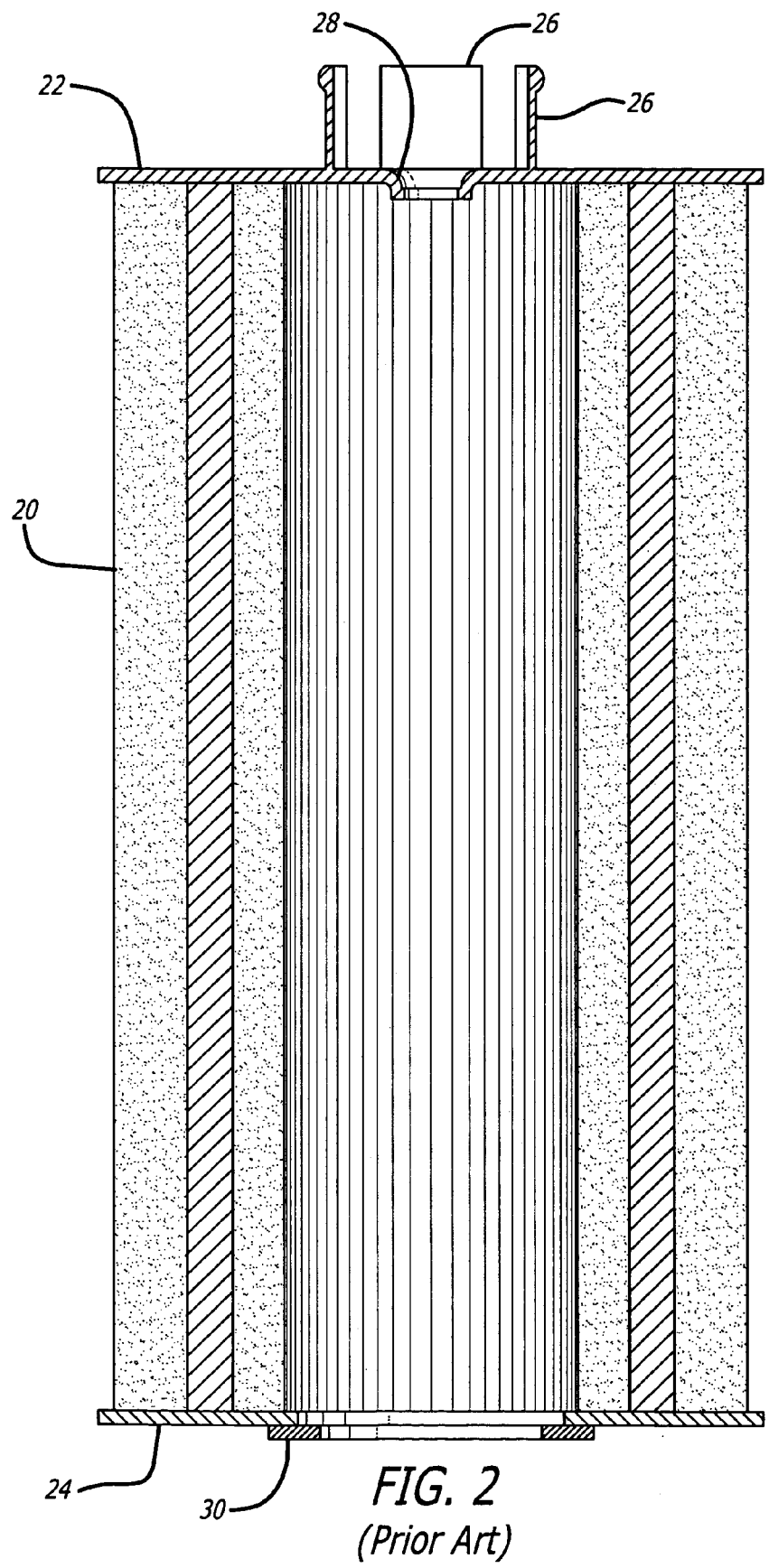
FIG. 2 is a cross section of the prior art filter of FIG. 1.
Figure 3:
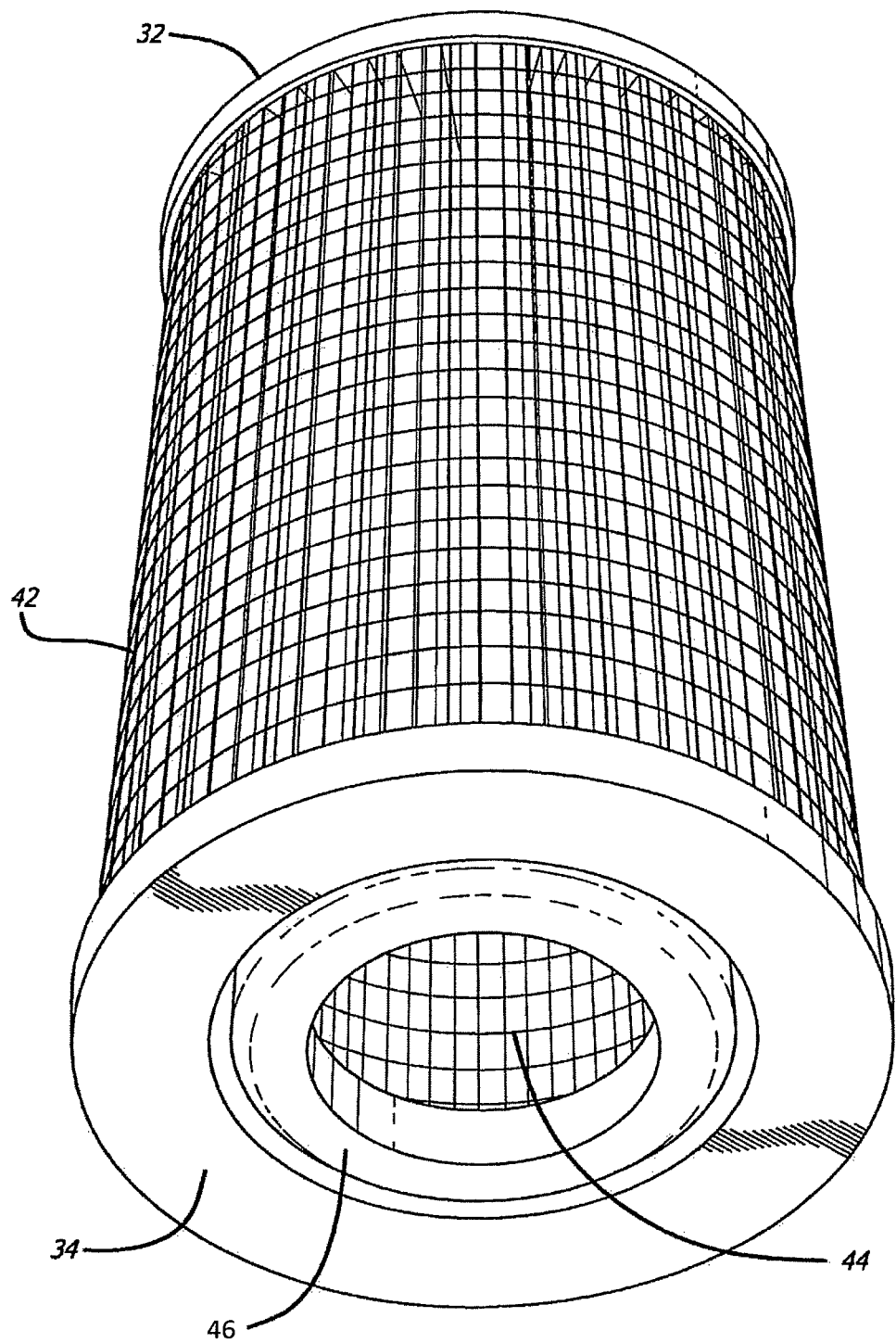
FIG. 3 is a perspective view of a drop-in filter in accordance with the present invention configured to replace filters in accordance with FIGS. 1 and 2.
Figure 4:
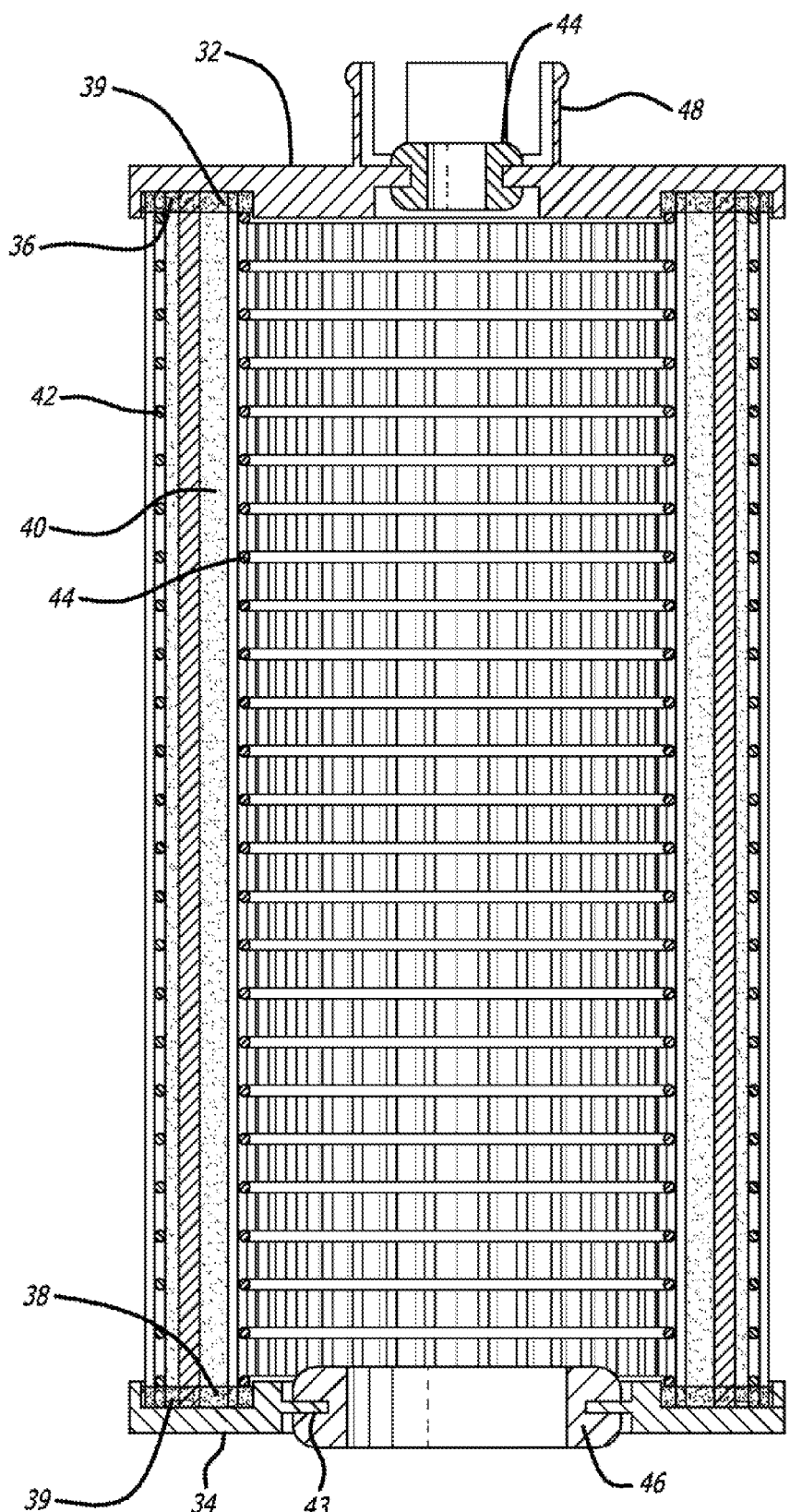
FIG. 4 is a cross section of the filter of FIG. 3.

An exemplary filter in accordance with the present invention is illustrated in FIGS. 3 and 4. This filter is configured as a direct substitution for the prior art filter of FIGS. 1 and 2, though obviously filters in accordance with the present invention may be configured as a replacement for substantially any prior art drop-in filter. As may be seen in Figures, top cap 32 and bottom cap 34 have annular recesses 36 and 38 that receive the ends of the pleated stainless steel woven mesh filter element 40, as well as the ends of outer wire cage 42 and the inner wire cage 44. These wire cages are formed of relatively heavy, welded stainless steel wire mesh and when rolled into a cylindrical cage, provide exceptionally strong protection for the pleated woven stainless steel filter element there between. The wire cages and the pleated woven stainless steel filter element are cemented to the top and bottom caps 32 and 34 by a ceramic adhesive 39. In that regard, during fabrication the wire cages and the pleated woven stainless steel filter element are assembled by first cementing them to one of the two caps by applying the cement and heating the assembly with the wire cages and filter element standing on the respective cap, and then turning over that subassembly to stand the same on the other cap as it is cemented in place. In the preferred embodiment, the cement is set at 370° Fahrenheit to provide a very durable, strong heat and oil resistant bonding of the assembly. Suitable ceramic cements for such purposes are readily commercially available.

The bottom cap 34 has an opening there through with a radially inward projecting lip 43 (thinner than the rest of the bottom cap 34) which receives a rubber and/or elastic grommet 46 having an inner diameter for slip fitting onto the outlet pipe in the filter enclosure. This quite well seals with respect to the pipe to prevent any meaningful flow of oil to the outlet pipe that has not passed through the filter itself. The rubber and/or elastic grommet 46 is preferably symmetrical about the groove therein receiving the radially inward projecting lip 43 so as to eliminate the need for care as to the orientation of the grommet during assembly.

In the embodiment shown, a similar but smaller grommet 44 is similarly positioned at the top of the filter. This, too, substantially seals to the pipe in the filter enclosure. Obviously in other embodiments, the sizes of the grommet, the presence of one or two grommets and physical sizes and shapes of the filter would be dependent on and simulate the corresponding parameters for the drop-in filter being replaced. Finally, in the embodiment of FIGS. 3 and 4, the top cap 32 has protrusions 48 thereon, duplicating the protrusions 26 on the drop-in filter of FIGS. 1 and 2 it replaces. Of course in the prior art embodiment of FIGS. 1 and 2, these protrusions are molded plastic, whereas in the embodiments of the present invention in FIGS. 3 and 4 the top and bottom cap, as well as protrusions 48, are aluminum and accordingly, much more durable.

While an exemplary preferred embodiment of the present invention has been disclosed and described herein for purposes of illustration and not for purposes of limitation, will be understood by those skilled in the art that various changes in form and detail may be made therein without departing from the spirit and scope of the invention.

What is claimed is:

1. A drop-in oil filter comprising:
    a top cap and a bottom cap, both caps having first surfaces that are facingly disposed, second surfaces opposite the first surfaces, and annular recesses on the first surfaces adjacent their outer periphery;
    a pleated, woven metal cylindrical filter element having an outer and an inner diameter and first and second ends;
    a first cylindrical wire cage over the outer diameter of the pleated, woven metal cylindrical filter element, the first cylindrical wire cage having first and second ends;
    a second cylindrical wire cage within the inner diameter of the of pleated, woven metal cylindrical filter element, the second cylindrical wire cage having first and second ends;
    the first ends of the pleated, woven metal cylindrical filter element and the first and second cylindrical wire cages being fastened into the annular recess in the top cap;
    the second ends of the pleated, woven metal cylindrical filter element and the first and second cylindrical wire cages being fastened into the annular recess in the bottom cap;
    the bottom cap having a first opening there through concentric with and within inner diameters of the pleated, woven metal cylindrical filter element and the first and second cylindrical wire cages, the first opening being surrounded by an annular relief in the first and second surfaces of the bottom cap to form a single radially inwardly projecting lip thinner than the surrounding area of the bottom cap;
    a first elastic grommet within the first opening having a central opening for sealing on a tube within a drop-in filter housing, the central opening being a plain cylindrical surface having a first height, the first elastic grommet having a single annular recess around its outer periphery, the inwardly projecting lip being positioned within the annular recess, the first elastic grommet held by the inwardly projecting lip such that the first elastic grommet extends beyond the second surface of the bottom cap with the first elastic grommet supported against radial displacement by cylindrical walls at an outer periphery of the annular reliefs.

2. The drop-in filter of claim 1 wherein the pleated, woven metal cylindrical filter element is a stainless steel filter element.

3. The drop-in oil filter of claim 1 further comprising a second opening through the upper cap concentric with and within inner diameters of the pleated, woven metal cylindrical filter element and the first and second cylindrical wire cages; and,
    a second elastic grommet within the second opening having a central opening for sealing on a tube within a drop-in filter housing.

4. The drop-in oil filter of claim 1 wherein the first elastic grommet is symmetrical about the annular recess around its periphery such that the first elastic grommet can be fitted on the inwardly projecting lip in either orientation.

5. The drop-in oil filter of claim 1 wherein the first ends of the pleated, woven metal cylindrical filter element and the first and second cylindrical wire cages are fastened into the annular recess in the top cap, and the second ends of the pleated, woven metal cylindrical filter element and the first and second cylindrical wire cages are fastened into the annular recess in the bottom cap by a cement.

6. The drop-in oil filter of claim 1 wherein the first ends of the pleated, woven metal cylindrical filter element and the first and second cylindrical wire cages are fastened into the annular recess in the top cap, and the second ends of the pleated, woven metal cylindrical filter element and the first and second cylindrical wire cages are fastened into the annular recess in the bottom cap by a ceramic cement.

7. The drop-in oil filter of claim 1 further comprised of alignment protrusions extending upward from the top cap.

8. A drop-in oil filter comprising:
    a top cap and a bottom cap, both caps having first surfaces that are facingly disposed, second surfaces opposite the first surfaces, and annular recesses on the first surfaces;
    a pleated, woven metal cylindrical filter element having an outer and an inner diameter and first and second ends;
    the first end of the pleated, woven metal cylindrical filter element being fastened into the annular recess in the top cap;
    the second end of the pleated, woven metal cylindrical filter element being fastened into the annular recess in the bottom cap;
    the bottom cap having a first opening there through concentric with and within an inner diameter of the pleated, woven metal cylindrical filter element, the first opening being surrounded by an annular relief in the first and second surfaces of the bottom cap to form a single radially inwardly projecting lip thinner than the surrounding area of the bottom cap;

a first elastic grommet within the first opening having a central opening for sealing on a tube within a drop-in filter housing, the central opening being a plain cylindrical surface having a first height, the first elastic grommet having a single annular recess around its outer periphery, the inwardly projecting lip being positioned within the annular recess, the first elastic grommet held by the inwardly projecting lip such that the first elastic grommet extends beyond the second surface of the bottom cap with the first elastic grommet supported against radial displacement by cylindrical walls at an outer periphery of the annular reliefs.

9. The drop-in oil filter of claim 8 further comprising a second opening through the upper cap concentric with and within an inner diameter of the pleated, woven metal cylindrical filter element; and, a second elastic grommet within the second opening having a central opening for sealing on a tube within a drop-in filter housing.

10. The drop-in oil filter of claim 8 wherein the first elastic grommet is symmetrical about the annular recess around its periphery such that the first elastic grommet can be fitted on the inwardly projecting lip in either orientation.

11. The drop-in oil filter of claim 8 wherein the first end of the pleated, woven metal cylindrical filter is fastened into the annular recess in the top cap, and the second end of the pleated, woven metal cylindrical filter is fastened into the annular recess in the bottom cap by a cement.

12. The drop-in oil filter of claim 8 wherein the first end of the pleated, woven metal cylindrical filter element is fastened into the annular recess in the top cap, and the second ends of the pleated, woven metal cylindrical filter is fastened into the annular recess in the bottom cap by a ceramic cement.

13. The drop-in oil filter of claim 8 further comprised of alignment protrusions extending upward from the top cap.

14. A drop-in oil filter comprising:

a top cap and a bottom cap, both caps having first surfaces that are facingly disposed, second surfaces opposite the first surfaces, and annular recesses on the first surfaces adjacent their outer periphery;

a pleated, woven metal cylindrical filter element having an outer and an inner diameter and first and second ends;

a first cylindrical welded stainless steel wire mesh cage over the outer diameter of the pleated, woven metal cylindrical filter element, the first cylindrical wire cage having first and second ends;

a second cylindrical welded stainless steel wire mesh cage within the inner diameter of the of pleated, woven metal cylindrical filter element, the second cylindrical wire cage having first and second ends;

the first ends of the pleated, woven metal cylindrical filter element and the first and second cylindrical wire mesh cages being fastened into the annular recess in the top cap;

the second ends of the pleated, woven metal cylindrical filter element and the first and second cylindrical wire mesh cages being fastened into the annular recess in the bottom cap;

the bottom cap having a first opening there through concentric with and within inner diameters of the pleated, woven metal cylindrical filter element and the first and second cylindrical wire cages, the first opening being surrounded by an annular relief in the first and second surfaces of the bottom cap to form a single radially inwardly projecting lip thinner than the surrounding area of the bottom cap;

a first elastic grommet within the first opening having a central opening for sealing on a tube within a drop-in filter housing, the central opening being a plain cylindrical surface, the first elastic grommet having a single annular recess around its outer periphery, the inwardly projecting lip being positioned within the annular recess, the first elastic grommet held by the inwardly projecting lip such that the first elastic grommet extends beyond the second surface of the bottom cap.

15. The drop-in oil filter of claim 14 wherein the first elastic grommet slips on to the inwardly projecting lip.

16. The drop-in oil filter of claim 1 wherein the first elastic grommet slips on to the inwardly projecting lip.

17. The drop-in oil filter of claim 8 wherein the first elastic grommet slips on to the inwardly projecting lip.

\* \* \* \* \*